July 7, 1964  M. P. HARWOOD  3,139,785
AXIAL LOAD BEARING ANCHORING MEANS FOR FASTENER PINS
Filed Aug. 30, 1961

INVENTOR.
MALCOLM P. HARWOOD
BY
R.E. Geangue
ATTORNEY

United States Patent Office 3,139,785
Patented July 7, 1964

3,139,785
AXIAL LOAD BEARING ANCHORING MEANS FOR FASTENER PINS
Malcolm P. Harwood, North Hollywood, Calif., assignor to Wedgelock Corporation of California, North Hollywood, Calif., a corporation of California
Filed Aug. 30, 1961, Ser. No. 134,952
1 Claim. (Cl. 85—6)

This invention relates to an axial load bearing anchoring means and more particularly to a means for anchoring one or more elongated pins or wires in an enlarged head of a member subject to axial loads as, for example, an axially movable stud of a releasable fastener for retracting and protracting a pair of spaced pins or wires relative to a body of the fastener.

More specifically, this invention provides a new and improved means for anchoring a pair of elongated pins or wires of a releasable fastener to the axially movable stud thereof so as to be axially movable therewith for preventing removal of the pins from the stud, more particularly from a chuck holding the pins, outwardly of the stud member in response to an axial load applied to the outer ends of the pins during use. This invention may be advantageously applied to many applications wherein a pair of elongated pins are anchored in a stud member and in which the pins are subjected to excessive and repetitive axial load. However, a specific application is herein illustrated and described to exemplify the use of the invention more clearly. It is therefore to be understood that the invention is not to be limited to the example cited herein but is useful in other applications which will be more apparent by those skilled in the art as suggested by the drawings and detailed description. The example herein cited is that of a releasable fastener having a pair of work-engaging pins anchored in a stud movably mounted in the body of the fastener for non-rotating movement relative to the body so as to grip a workpiece between outer ends of the pins and a work-engaging end of the body in response to axial movement of the stud in one direction. The stud of the fastener is retracted and protracted relative to the body by either manually operated means in the form of a hand wrench, and the like, or by power-operated, nut runner tools or attachments which actuate a nut engaged with a threaded portion of the stud and are coactive with the body of the fastener to retract the pins at an increased speed.

Although the powered nut runner tools or attachments usually include a torque limiting means by which the torque applied to the nut may be limited, relatively severe shock loads are applied to the stud member when the pins are caused to retract so as to clamp a workpiece between the enlarged outer ends of the pins and a work-engaging surface of the body of the fastener. In the past, the inner ends of the pins have been anchored within a chuck having a substantially rounded or bullet nosed forward end which, when swaged in a blind bore of the head of the stud, offered a construction in which the pins tended to pull outwardly of the enlarged head of the stud member when an excessive axial load was applied to the outer ends of the pins. Although powered nut runner tools or attachments included torque limiting means, the axial load placed against the pins which was transmitted to the chuck member and against a swaged end of the head resulted in a camming or expanding action of the bullet nosed forward end of the chuck against the inwardly swaged forward end of the head to expand the swaged end and permit pulling out of the bullet-nosed chuck, making the fastener inoperative or loosening the chuck sufficiently to make it less efficient.

This invention, on the other hand, provides an improved means for anchoring the pins in the chuck and for anchoring the chuck relative to the enlarged head of the stud member so as to direct the resultant of the axial load more prominently in an axial direction rather than a radial direction so as to prevent expansion of the swaged end of the head. This is accomplished by providing a plurality of stepped, spaced, internal annular shoulders which are faced inwardly relative to the bottom of the axial blind bore defined in the enlarged head and complementary to and equal plurality of outwardly-facing external stepped shoulders formed on the exterior of the chuck, the shoulders being substantially concentric and normal to the force of the axial load applied to the outer end of the pins tending to pull the pins outwardly of the enlarged head so as to effectively counter the load. A similar construction is used to hold the pins within the chuck member in spaced relationship and a spacer means is provided which completely fills the gap between the spaced inner ends and has shoulders complementary to an inner shoulder of the chuck. Therefore, when an axial load is placed against the outer ends of the pins, tending to separate the pins from the enlarged head, the load is transmitted in a substantially axial direction against the annular shoulders coactive between the chuck and the enlarged head and between the internal shoulder of the chuck and external shoulders of the inner ends of the pins and of the spacer to be substantially countered by the shoulders which are substantially normal to the load.

It is therefore an object of this invention to provide a new and improved axial load bearing anchoring means for a pair of pins anchored in a blind bore of the stud member which resists axial loads tending to pull the pins outwardly of the bore.

It is another object of this invention to provide a new and improved anchoring means which is readily adaptable to the present assembly and manufacturing means and methods.

A further object of this invention is to provide a new and improved axial load bearing anchoring means for a pair of pins in which the resultant of the axial force tending to pull the pins outwardly of the bore of the stud is more nearly in an axial direction and countered by shoulder means substantially normal to the load.

A general object of this invention is to provide a new and improved anchoring means of the character described which overcomes disadvantages of prior means and methods heretofore intended to accomplish generally similar purposes.

These and other objects of this invention will be more apparent from the following detailed description, drawings and appended claim.

Figure 1:
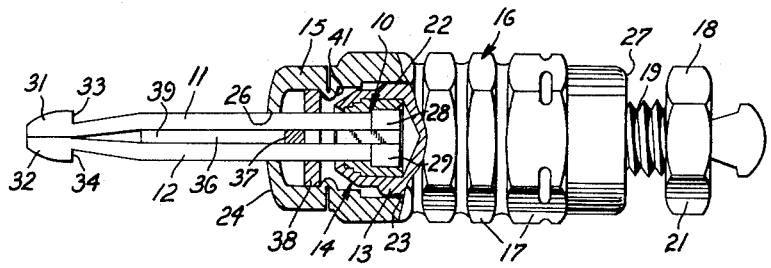
FIGURE 1 is a side view, in elevation, of a releasable fastener having embodied therewith an anchoring means of this invention, with parts broken away for greater clarity.

Referring in detail to the drawings, there is shown by way of illustration, but not of limitation, an anchoring means generally designated by the numeral 10, designed and constructed in accordance with this invention, and exemplified as anchoring a pair of elongated pins 11 and 12 in an enlarged head 13 of a stud member 14 axially movable in a body 15 of a releasable fastener generally designated by the numeral 16. The releasable fastener 16, illustrated herein, is shown as an example to illustrate the invention, which is not to be limited thereto except as in combination with the invention per se, the anchoring means being applicable to various other applications which will be readily apparent to persons skilled in the art.

In general, the fastener 16 comprises the body 15 having a non-circular, tool-engageable outer configuration, as for example, the hexagonal outer surfaces 17 herein illustrated, so as to adapt the body 15 to be non-rotatably held either by manually operated means, such as a wrench and the like, or as by a powered nut runner attachment, more specifically an outer sleeve thereof (not shown), having an inner configuration complementary to the outer configuration 17. A stud member 14 is movably mounted in the body 15 for axial movement relative thereto. A nut member 18 is threadably engaged with external threads of a shank 19 of the stud member 14, the member 18 having a non-circular, tool-engageable outer configuration, indicated by the numeral 21, adapted to be engaged by an inner, rotatable sleeve (not shown) of the nut runner for axially moving the stud member 14 in response to rotation of the nut means 18 in one direction.

The stud member 14 is keyed to the interior of the body 15 by virtue of the enlarged head 13 having a non-circular portion 22 complementary to a non-circular inner bore 23 of the body 15. One end 24 of the body is closed and serves as a work-engaging surface, the end 24 having an opening 26 extending therethrough through which the pins 11 and 12 extend. The opposite end 27 of the body is open and is provided with an annular bearing (not shown) through which the shank 19 of the stud member 14 is axially movable. The work-engaging pins 11 and 12 are each secured at their inner ends 28 and 29, respectively, to the enlarged head 13 for axial movement therewith by the anchoring means 10. The pins 11 and 12 are in spaced, substantially parallel relationship, having outer ends converging as shown in the FIGURES 1 and 2, the outer ends being enlarged at the outer extremities or tips 31 and 32, respectively, to provide inwardly-facing shoulders 33 and 34, respectively. In the normal position of FIGURE 1, the tips 31 and 32 are biased into juxtaposition so as to form a substantially spherical exterior insertable through aligned apertures of two or more sheets or work pieces (not shown).

A spreader member 36, as best seen in FIGURE 1, is T-shaped in configuration and is interposed between the spaced portions of the pins 11 and 12 with its crossarm 37 disposed within the body 15, between the closed end 24 of the body 15 and a retaining washer 38 and having its central arm 39 extending through the opening 26 and between the pins 11 and 12. The spreader 36 is held in this position by an internal angular flange 41 backing the washer 38 so as to prevent axial movement thereof.

As will now be more clearly understood from the foregoing description, the stud 14 is keyed to the body 15 by a sliding engagement of the enlarged head portion 22 in the bore 23 so as to protract or retract the pins 11 and 12 secured to the head 13. When the stud member 14 is bottomed in the body 15, adjacent to the washer 38, pins 11 and 12 are protracted and have their outer enlarged ends 31 and 32 juxtaposed and insertable through the referred to apertures of a workpiece. In response to the rotation of the nut means 18 in one direction (to the left as viewed in the drawings), the stud member 14 is axially retracted in an opposite direction, to the right as viewed in FIGURE 1, to retract the pins 11 and 12 through the opening 26 of the work-engaging closed end 24. The central arm 39 of the T-shaped spreader member 36 acts upon the convergent portions of the pins to spread the ends 31 and 32 apart and increase the combined outer configuration of the edge to one larger than the openings of the workpieces so as to abut the outer surfaces of the outermost workpiece with the shoulders 33 and 34. While retracted, the pins 11 and 12 clamp the workpieces between the workpiece engaging closed end 24 of the body and the shoulders 33 and 34 of the pins.

Although in the past, the pins like 11 and 12 have been anchored in an end like 13 by insertion of the inner ends 28 and 29, respectively, thereof within a chuck member which in turn is inserted into a blind bore of the enlarged head and the exterior of the enlarged head swaged so as to clamp the inner ends 28 and 29 for anchoring thereof, it has been found more satisfactory and therefore the subject of this invention, to form the exterior of the chuck in such manner that when the forward end of the head member is swaged thereover, the axial load transmitted to the chuck member is directed to the swaged end of the enlarged head 13 in a substantially prominent axial direction.

In the past the axial load applied to the chuck tended to force or cam the swaged end of the enlarged head outwardly and permit pulling the chuck member outwardly of the swaged end in response to the axial load by camming the swaged end to flare outwardly to an annular condition.

The chuck member, designated by the numeral 45, is generally cylindrical in outer configuration having an outer circumferential surface 46 substantially complementary to the interior of a blind bore 47 formed axially in the head 13. A plurality of outwardly-facing shoulders are formed directed towards the open end 48 of the bore 47 and are arranged in stepped relationship by progressively reducing the outer end of the chuck, as indicated at 49 and 51, to form outwardly-facing annular shoulders 52, 53 and 54, substantially normal to the longitudinal axis of the stud 14, the shoulder 54 being essentially formed by the outer end 56 of the chuck. The chuck 45 is further provided with an axial bore 57 and an axial counter bore 58 substantially concentric therewith defining therebetween an annular internal shoulder indicated by the numeral 59 substantially normal to the longitudinal axis of the stud 14. The inner ends 28 and 29 of the pins 11 and 12 are each substantially semi-cylindrical in cross section, having opposed relatively flat inner faces 61 and 62, respectively, and outwardly-facing, arcuate shoulders 63 and 64, respectively. The inner ends 28 and 29, when in spaced relationship and installed within the bore 57 and counter bore 58, are substantially complementary to the bores, forming a gap 66 between the faces 61 and 62. The gap 66 is substantially filled with a spacer member 67 substantially equal to the gap 66 and having opposed edges 68 and 69 complementary to the bore 57 and counter bore 58 with intermediate opposing shoulders 71 and 72 engaging the annular shoulder 59 formed by the bores. It will be noted that the outer edges 68 and 69 are substantially arcuate in configuration so as to conform to the cylindrical configuration of the bores 57 and 58.

Figures 3, 4:
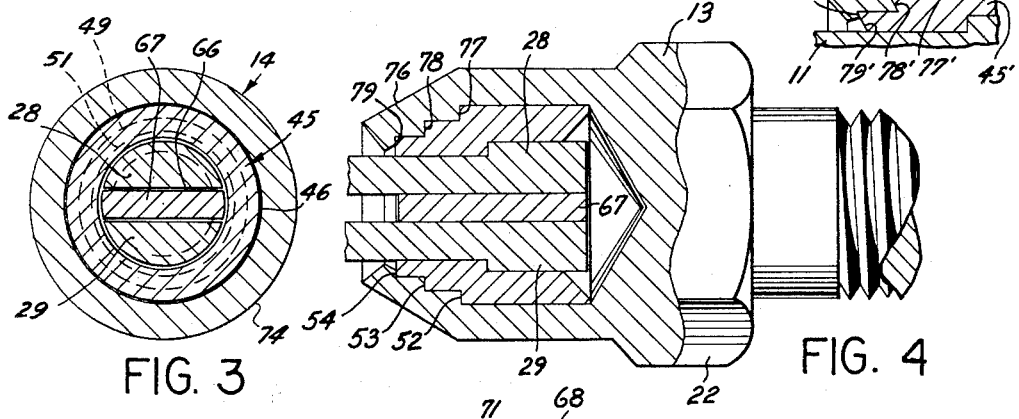
FIGURE 3 is a vertical, cross-sectional view as taken substantially along the line 3—3 of FIGURE 2.
FIGURE 4 is a fragmentary, enlarged, cross-sectional view, similar to FIGURE 2, with parts thereof shown in assembled relationship.
Figure 5:
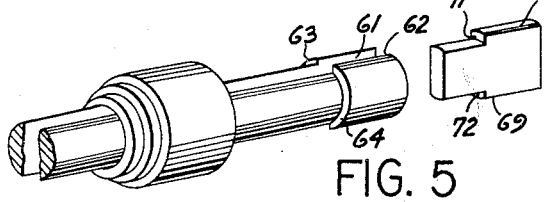
FIGURE 5 is a perspective view of parts of the pin-holding means of this invention illustrated in exploded relationship.

After the ends 28 and 29 and spacer member 67 are assembled with the spacer 67 filling the gap 66 and installed together within the interior of the chuck 45, the annular wall 73 of the head 13, defined by the blind bore 47 and the outer cylindrical surface 74 of the head 13, is inwardly swaged to form an outer frusto-conical outer end 76, as best seen in FIGURE 4. By virtue of a swaging operation, the interior surface of the blind bore 47 is deformed as seen in FIGURE 4 to define a plurality of inwardly-facing, annular shoulders 77, 78, and 79 complementary to the shoulders 52, 53 and 54, respectively. The shoulder engagements 52–77, 53–78, and 54–79 are each in a plane substantially normal to the longitudinal axis of the head 13 and of the axial force placed against the pins 11 and 12. Therefore, it will be appreciated that the resultant of the axial force is substantially in a direction parallel to the axis of the enlarged head and pins, the resultant force being countered by the resistance of the annular areas of the shoulders. It has been found that a stepping configuration of three shoulders is adequate to prevent flaring out of the wall 73 thereat as occurred in previous prior art devices. Inasmuch as the area within the cylindrical portion of blind bore 47 is substantially filled by the combination of the chuck 45, the ends 28 and 29 and the spacer member 67, which are tightly swaged together after the swaged operation, the single annular shoulder combination 59-63 is sufficient to retain the inner ends 28 and 29 of the pins in the chuck member 45, there being no space within the chuck in which material can flow in response to an axial force.

Figures 2, 6:
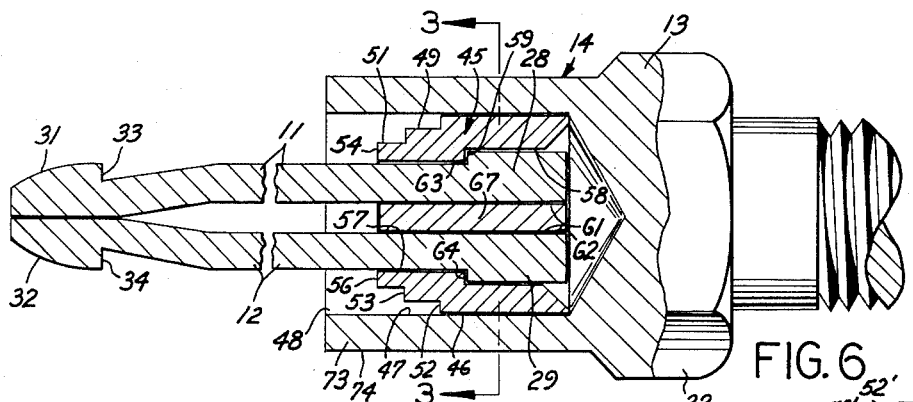
FIGURE 2 is an enlarged, fragmentary, cross-sectional view of a portion of the stud member, illustrating the relationship of an enlarged head to a pin-holding means of the invention, with parts shown in elevation.
FIGURE 6 is a fragmentary, cross-sectional view illustrating a modified embodiment of this invention.

FIGURE 6 illustrates a modified embodiment 10' of this invention in which the shoulders of the chuck, indicated at 45', is provided with a plurality of outwardly-facing spaced, stepped shoulders 52', 53' and 54' which are undercut and engaged with complementary undercut, annular, inwardly-facing shoulders 77', 78' and 79' formed in response to swaging of the annular wall 73' of the enlarged head 13'. The undercut shoulders provide increased resistance to axial loads. In other respects, the embodiment 10' is similar to the first embodiment 10.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claim.

What is claimed as new and desired to secure by Letters Patent is:

An anchoring means for anchoring a pair of elongated pins in an enlarged head of a stud member, said pins having inner ends with arcuate, outwardly-facing shoulders, said anchoring means comprising:

means defining a cylindrical bore of predetermined length in said head, said bore being open at one end and having a blind, opposite end;

a plurality of axially spaced internal, inwardly-facing annular shoulders in stepped relationship adjacent to said open end; and pin holding means in said bore for holding said inner ends of said pins in said bore, said pin holding means including a cylindrical body having an axial bore and a counter bore so as to define an inwardly-facing annular shoulder, said arcuate outwardly-facing shoulders of said pins being in engagement with said inwardly-facing shoulder of said body, said body having an outer configuration complementary to the interior of said bore and including an equal plurality of external, annular, outwardly-facing shoulders in engagement with said inwardly-facing shoulders of said head, said annular shoulders being frusto-conical in relationship to the longitudinal axis of said stud member for resisting axial loads acting to pull said pins outwardly of said stud member, said annular shoulders sloping inwardly toward said inner ends of said pins with the smallest dimension of each shoulder nearest said inner ends.

References Cited in the file of this patent
UNITED STATES PATENTS

| | | |
|---|---|---|
| 2,386,967 | Mancini | Oct. 16, 1945 |
| 2,387,371 | Wallace | Oct. 23, 1945 |